United States Patent [19]

Carlson

[11] 3,917,964

[45] Nov. 4, 1975

[54] SIGNAL TRANSLATION USING THE SUBSTRATE OF AN INSULATED GATE FIELD EFFECT TRANSISTOR

[75] Inventor: David J. Carlson, Princeton, N.J.

[73] Assignee: RCA Corporation, New York, N.Y.

[22] Filed: Dec. 17, 1962

[21] Appl. No.: 245,063

[52] U.S. Cl. .................... 307/304; 330/35; 330/38; 331/117; 357/23

[51] Int. Cl. ........................ H03k 3/26; H03k 19/08

[58] Field of Search .......... 307/88.5; 330/12, 38-39, 330/38 FE; 325/451; 331/107, 108, 117; 317/235 NR, 235 FE, 235, 235 A

[56] References Cited

UNITED STATES PATENTS

| | | | |
|---|---|---|---|
| 2,791,758 | 5/1957 | Looney | 340/173 |
| 2,791,760 | 5/1957 | Ross | 340/173 |
| 2,820,154 | 1/1958 | Kurshan | 307/88.5 |
| 2,918,628 | 12/1959 | Stuetzer | 330/39 |
| 2,960,665 | 11/1960 | Jackson | 331/108 |
| 3,010,014 | 11/1961 | Tanimura | 325/451 |
| 3,035,186 | 5/1962 | Doucette | 307/88.5 |
| 3,061,739 | 10/1962 | Stone | 307/88.5 |
| 3,063,020 | 11/1962 | Horowitz | 330/12 |
| 3,102,230 | 8/1963 | Kahng | 307/88.5 |
| 3,105,177 | 9/1963 | Aigrain et al. | 317/234 |
| 3,107,331 | 10/1963 | Barditch | 325/451 |
| 3,130,377 | 4/1964 | Brown | 331/108 |
| 3,131,312 | 4/1964 | Putzrath | 307/88.5 |
| 3,202,840 | 8/1965 | Ames, Jr. | 307/88.5 |
| 3,213,299 | 10/1965 | Rogers | 307/88.5 |
| 3,229,120 | 1/1966 | Carlson | 307/88.5 |
| 3,229,218 | 1/1966 | Sickles | 330/29 |
| 3,246,177 | 4/1966 | Schroeder | 307/88.5 |
| 3,260,948 | 7/1966 | Theriault | 330/18 |

*Primary Examiner*—Andrew J. James
*Attorney, Agent, or Firm*—Eugene M. Whitacre; Kenneth R. Schaefer

EXEMPLARY CLAIM

1. A signal translating circuit comprising,
   an insulated-gate field-effect transistor of the type having gate, source and drain electrodes formed on a semiconductor substrate,
   circuit means coupled between said gate and source electrodes for establishing an operating characteristic of said transistor,
   input circuit means coupled between said substrate and said source electrode for applying signals to be translated, and
   output circuit means coupled between said source and drain electrodes for developing output signals corresponding to those applied between said substrate and said source electrode.

27 Claims, 15 Drawing Figures

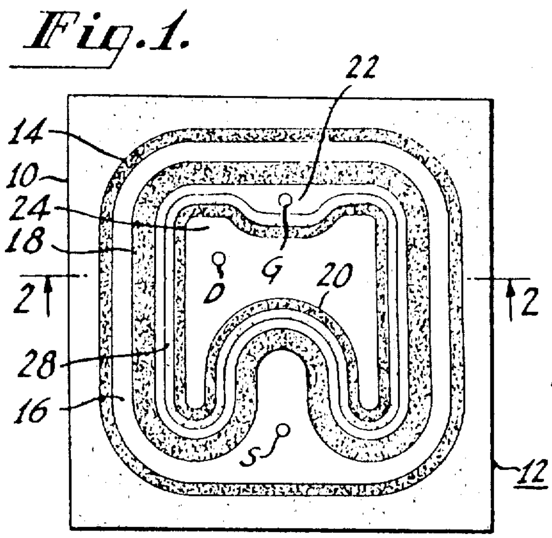
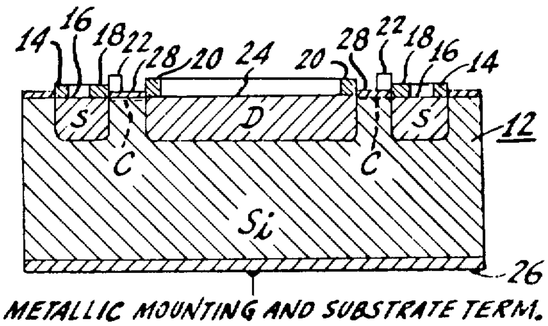
FIG. 2
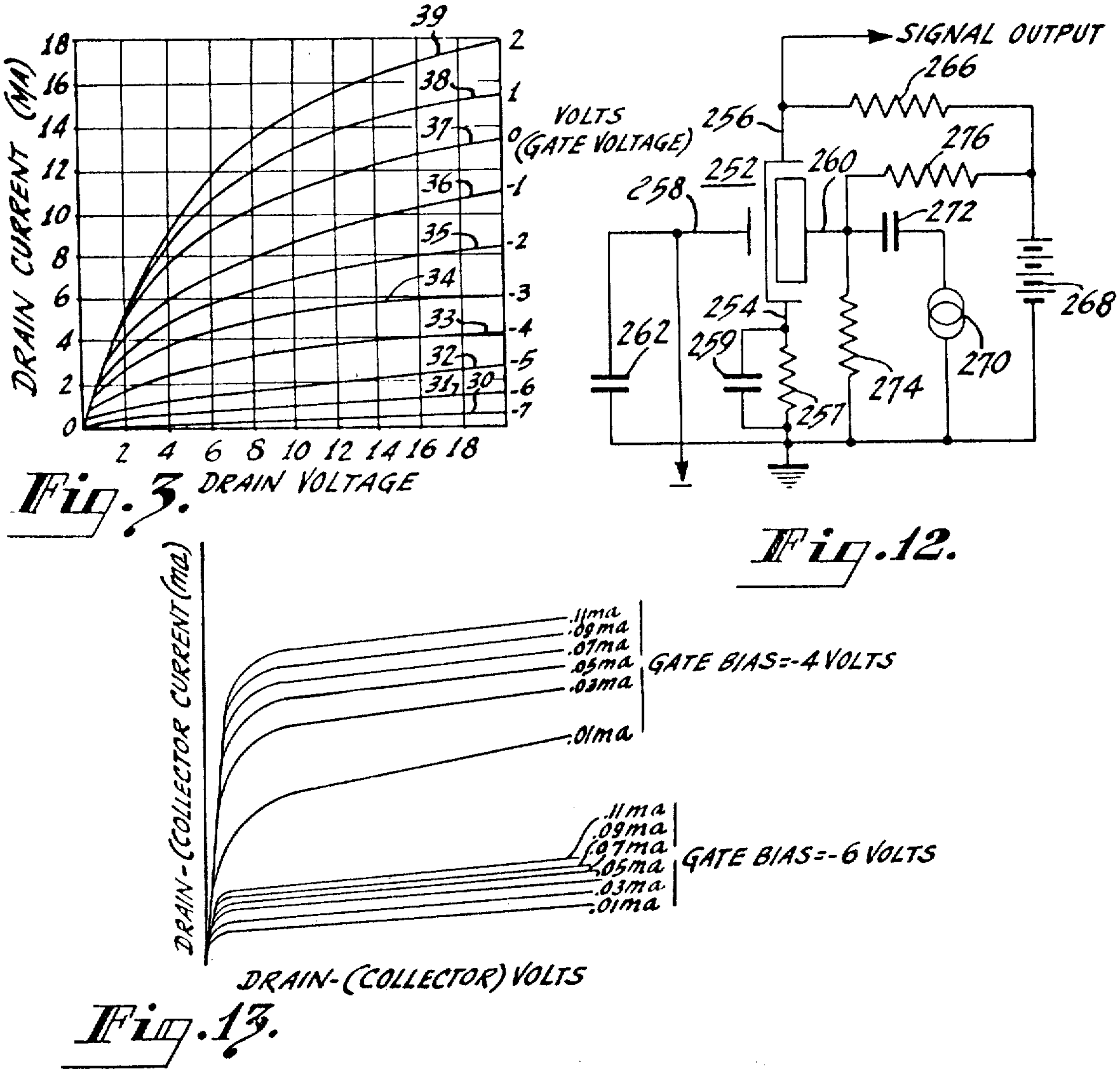
FIG. 3, FIG. 12, FIG. 13

SIGNAL TRANSLATION USING THE SUBSTRATE OF AN INSULATED GATE FIELD EFFECT TRANSISTOR

This invention relates to electrical signal translating circuits, and more particularly relates to signal amplifier circuits using field-effect transistors.

One type of field-effect transistor, known as an insulated-gate field-effect transistor, has source, drain and gate electrodes formed on a semiconductor substrate. The gate electrode is disposed on a layer of insulating material overlying a conducting channel between the source and drain electrodes. Ordinarily signal translating circuits utilizing the insulated-gate field-effect transistor include an input circuit coupled between the source and gate electrodes so that the current in the conducting channel is modulated in accordance with the electrical field produced by the input signal voltage. The amplified signal is developed in an output circuit coupled between the source and drain electrodes.

It has been discovered that the insulated-gate field-effect device can be advantageously employed in signal translating circuits if a signal to be translated is applied between the substrate and source electrodes. The substrate electrode thus provides a second control electrode for the insulated-gate field-effect transistor.

Circuits embodying the invention may be classified into two general categories. The first category of circuits are those in which the substrate electrode is reversely biased relative to the source and drain electrodes. Under these conditions the translation characteristic of the device is due to field effect control of the current carriers in the device. Both the gate and substrate electrode exhibit high input impedance and can be used to control the transconductance of the device. An input signal may be simultaneously applied to both the gate and substrate electrodes to enhance the maximum transconductance of the device as compared to the case where the signals are applied to only one of the control electrodes. If desired, separate signals may be applied to the gate and substrate electrodes for signal mixing comparison, etc.

The second category of circuits embodying the invention are those in which the source, drain and substrate electrodes operate as a bipolar or junction transistor. Transistor action is produced when the substrate electrode is forward biased relative to the source electrode, and reverse biased relative to the drain electrode. As will be explained hereinafter, an insulated-gate field-effect transistor includes rectifying junctions between the substrate electrode and the source and drain electrodes respectively. These rectifying junctions operate in a similar manner to the base-emitter and base-collector rectifying junctions of a junction transistor. With circuits of the second category, the gate electrode exhibits a high input impedance whereas the input impedance of the substrate electrode is relatively low. Accordingly the device may be efficiently coupled to a pair of signal sources of markedly differed impedance. It was found that the voltage of the gate electrode controls the beta exhibited by the source, drain substrate transistor. The term beta indicates the incremental change of collector current for an incremental change of base current. Thus the gate electrode voltage may be varied to control the gain of the source-drain-substrate transistor without changing its operating point.

The novel features which are considered to be characteristic of this invention are set forth with particularity in the appended claims. The invention itself however, both as to its organization and method of operation will best be understood from the following description when read in connection with the accompanying drawings in which:

FIG. 1 is a diagrammatic view of a field-effect transistor suitable for use in circuits embodying the invention;

FIG. 2 is a section view taken along section lines 2—2 of FIG. 2;

FIG. 3 is a graph showing a family of drain current vs. drain voltage curves for various values of gate-to-source voltages for the transistor of FIG. 1;

FIG. 12 is a schematic diagram of an insulated-gate field-effect amplifier circuit embodying the invention;

FIG. 13 is a graph of the drain voltage vs. drain current characteristic of the semiconductor device shown in the amplifier circuit of FIG. 12 for different values of substrate bias current and gate bias voltage;

Figure 10:
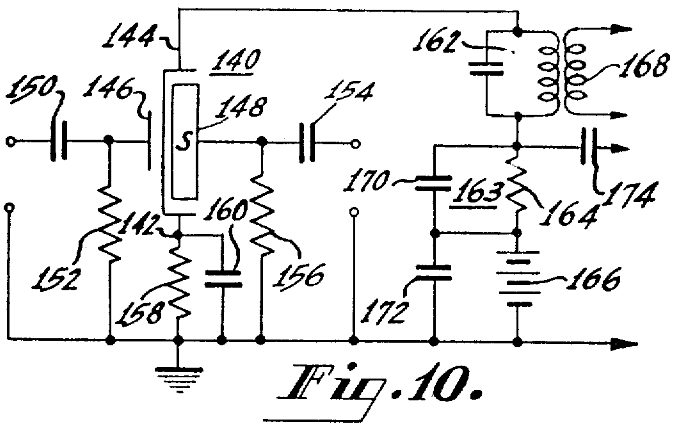
FIG. 10 is a schematic circuit diagram of a dual frequency amplifier embodying the invention.

Referring now to the drawings and particularly to FIG. 1 a field-effect transistor 10 which may be used with circuits embodying the invention includes a body 12 of semiconductor material. The body 12 may be either a single crystal or polycrystalline and may be of any of the semiconductor materials used to prepare transistors in the semiconductor art. For example the body 12 may be nearly intrinsic silicon, such as for example lightly doped P type silicon of 500 to 1,000 ohm cm. material.

In the manufacture of a device shown in FIG. 1, heavily doped silicon dioxide is deposited over the surface of the silicon body 12. The silicon dioxide is doped with n-type impurities. By means of a photo-resist and acid etching, or other suitable technique the silicon dioxide is removed in the area where the gate electrode is to be formed, and around the outer edges of the silicon wafer as viewed on FIG. 1. The deposited silicon dioxide is left undisturbed over those areas where the source-drain regions are to be formed.

The body 12 is then heated in a suitable atmosphere such as in water vapor so that exposed silicon areas are oxidized to form grown silicon dioxide layers indicated by the stippled areas of FIG. 1. During the heating process, impurities from the deposited silicon dioxide layer diffuse into silicon body 12 to form the source and drain regions. FIG. 2, which is a cross section view taken along section line 2—2 of FIG. 1, shows, the source-drain regions labelled S and D respectively.

By means of another photo-resist and acid etching or like step the deposited silicon dioxide over part of the source-drain diffused regions are removed. Electrodes are formed for the source, drain and gate regions by evaporation of a conductive material by means of an evaporation mask. The conductive material evaporated may be chromium and gold in the order named, for example, but other suitable metals may be used.

The finished wafer is shown in FIG. 1, in which the stippled area between the outside boundary and the first dark zone 14 is grown silicon dioxide. The white area 16 is the metal electrode corresponding to the source electrode. Dark zones 14, 18 are deposited silicon dioxide zones overlying the diffused source region and the dark zone 20 is a deposited silicon dioxide zone overlying the diffused drain region. White areas 22 and 24 are the metallic electrodes which correspond to the gate and drain electrodes respectively. The stippled zone 28 is a layer of grown silicon dioxide on a portion of which the gate electrode 22 is placed and which insulates the gate electrode 22 from the substrate silicon body 12 and from the source and drain electrodes as shown in FIG. 2. The silicon wafer is mounted on a conductive base or header 26 as shown in FIG. 2. The layer of grown silicon dioxide 28 on which the gate electrode 22 is mounted, overlies an inversion layer or conducting channel C, shown in dotted lines, connecting the source and drain regions. The gate electrode 22 is displaced towards the source region S so that the distance between the source region S and the gate electrode 22 is smaller than the distance of the gate electrode 22 and the drain region D. If desired the gate electrode may slightly overlap the deposited silicon dioxide layer 18 above the source electrode. It will be noted that the transistor is symmetrical, other than for the offset gate electrode, and that either of the electrodes D and S operate as the drain and the source electrodes as a function of the polarity of the bias potential applied therebetween; i.e., the electrode to which a positive bias potential is applied relative to the bias potential applied to the other electrode operates as a drain electrode and the other electrode operates as a source electrode.

The input resistance of the transistor described above is very high, measuring on the order of $10^{14}$ ohms at d-c.

FIG. 3 is a family of curves 30–39 illustrating the drain current versus drain voltage characteristic of the transistor of FIG. 1 for different values of gate-to-source voltage. A feature of an insulated-gate field-effect transistor is that the zero bias characteristic can be at any of the curves 30–39. In FIG. 3 the curve 37 corresponds to the zero bias gate-to-source voltage. Curves 38 and 39 represent positive gate voltages relative to the source and the curves 30–36 represent negative gate voltages relative to the source.

The location of the zero bias curve is selected during the manufacture of the transistor, i.e. by controlling the time and/or temperature of the step of the process when the silicon dioxide layer 28 shown in FIGS. 1 and 2 is grown.

The amplifier circuit of FIG. 4 utilizes an insulated-gate field-effect transistor 40 similar to the one described in connection with FIGS. 1 and 2. The transistor 40 has a source electrode 42 a drain electrode 44, a gate electrode 46 and a substrate electrode 48. The source electrode 42 and the gate electrode 46 are both connected to a point of reference potential, shown as ground. If desired the gate electrode may be biased to a desired potential, not shown, to control the translation characteristics of the circuit. The drain electrode 44 is connected through a resistor 56 to the positive terminal of a source of bias potential 60 which is shown as a battery. The negative terminal of the bias potential source 60 is connected to ground.

The substrate electrode 48 is coupled to a source 62 of signals to be amplified through a signal coupling capacitor 64. The bias potential on the substrate electrode 48 is set by a potential source 66, which is shown as a battery of adjustable voltage, and a resistor 68 which are connected in series between the substrate electrode and ground.

The source of potential 66 is poled in a manner to reversely bias, that is negatively bias, the substrate electrode 48 with respect to the source and drain electrodes 42 and 44 respectively. It will be noted with the transistor construction shown in FIGS. 1 and 2 that the source and drain regions S and D are of N-type material, whereas the substrate electrode 48 is of P-type material. The interface between the substrate electrode 48 and either of the source or drain electrodes comprises a P-N rectifying junction. As is known, to reversely bias such a P-N junction the negative terminal of a potential source is connected to the P region and the positive terminal of the source is connected to the N region. Naturally, if the substrate region is of N-type material relative to the source and drain regions, the potential supply source 66 will be poled to maintain the substrate electrode positive relative to the source and drain electrodes. In the circuit of FIG. 4 it will be noted that the substrate-source rectifying junction is reverse biased by an amount equal to the voltage exhibited by the potential source 66, whereas the substrate-drain rectifying junction is reverse biased by an amount equal to the sum of the potentials exhibited by the potential sources 60 and 66.

Figure 4:
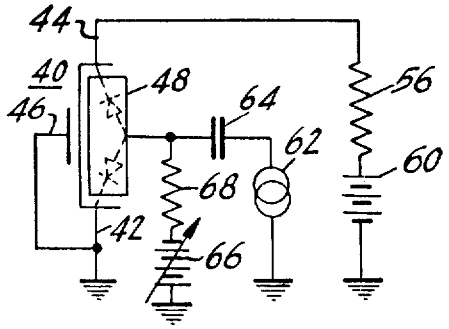
FIG. 4 is a schematic diagram of an insulated-gate field-effect transistor amplifier circuit embodying the invention.
Figure 5:
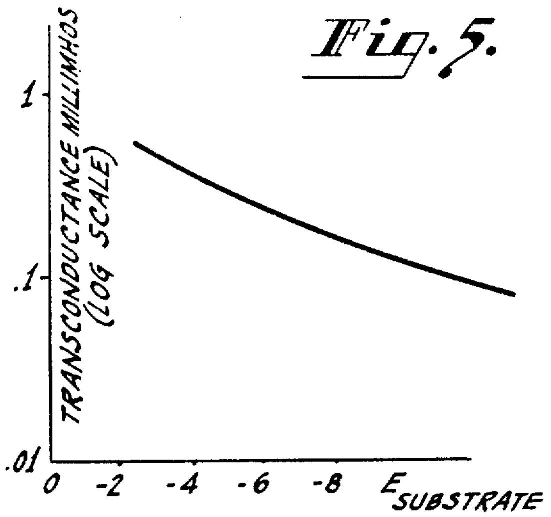
FIG. 5 is a graph of the transconductance vs. substrate bias voltage characteristic of the amplifier circuit shown in FIG. 4.

The transconductance of the amplifying circuit shown in FIG. 4 as a function of the d-c voltage on the substrate electrode is shown in FIG. 5. It will be noted that the transconductance of the circuit of FIG. 4 is maximum for relatively small negative potentials applied to the substrate electrode 48, and decreases as the substrate is made more negative. It is thought that this change in transconductance is due to a field effect type action somewhat similar to that effected if potentials were applied to the gate electrode 46.

Figure 6:
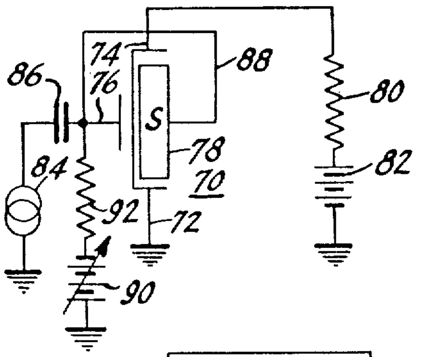
FIG. 6 is a schematic circuit diagram of an amplifier circuit embodying the invention wherein the substrate and gate electrodes of an insulated-gate field-effect transistor are directly coupled together.

Advantage is taken of the substrate transconductance characteristic in the amplifier circuit of FIG. 6. The circuit of FIG. 6 includes an insulated-gate field-effect transistor 70 of the type described in connection with FIG. 2. The transistor includes a source electrode 72, a drain electrode 74, a gate electrode 76 and a substrate electrode 78. The source electrode is grounded and the drain electrode 74 is connected through a resistor 80 and an operating potential supply 82 to ground. The resistor 80 represents the impedance of any suitable load for the amplifier circuit.

Signals to be amplified from a source 84 are coupled through a signal coupling capacitor 86 to the gate electrode 76 and to the substrate electrode 78 through a direct current conductive connection 88. The gate and substrate electrodes 76 and 78 are biased to the desired operating potential by an adjustable source of operating potential 90 which is connected in series with a resistor 92 between the gate electrode 76 and ground. As is shown the gate and substrate electrodes are biased negatively with respect to ground. It is to be understood that the circuit may be self-biased, if desired, by the use of a bypassed source resistor. Alternatively it will be understood that a single supply source with suitable voltage divider networks may supply the operating potentials for the source-drain and biasing circuits.

Figure 7:
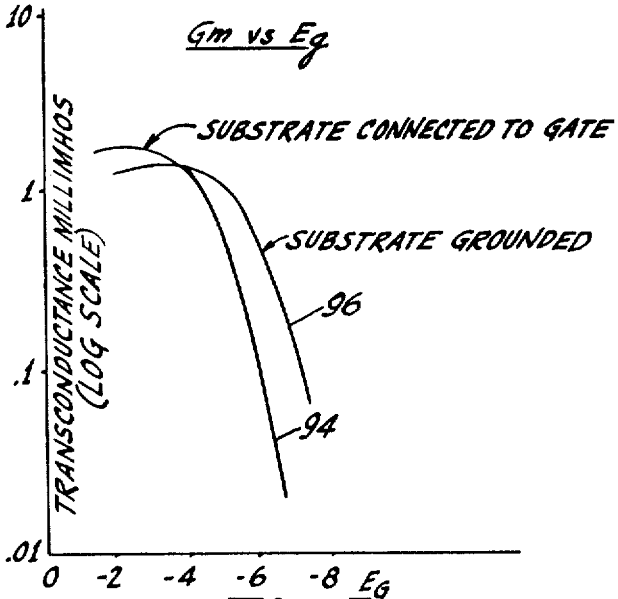
FIG. 7 is a graph showing the comparative transconductance characteristics of the amplifier circuit of FIG. 6 with that of a similar circuit wherein the substrate is grounded.

The transconductance vs. gate voltage characteristic for the circuit of FIG. 6 is shown by the curve 94 in FIG. 7. This transconductance characteristic is to be compared with that of a similar circuit where the substrate electrode 78 is disconnected from the gate electrode 76 and is grounded. The transconductance of such a modified circuit is shown by the curve 96 of FIG. 7. It has been found that the maximum transconductance of the circuit of FIG. 6 is increased as much as 50% as compared to circuits where the input signals are applied only to the gate electrodes. It will be noted from FIG. 7 that the circuit of FIG. 6 exhibits a characteristic 94 which tends to cut off more quickly than circuits where the substrate is grounded. The reason for this is that the depleting fields of the substrate and gate electrodes compliment each other to enable a sharper cutoff.

Figures 8, 9:
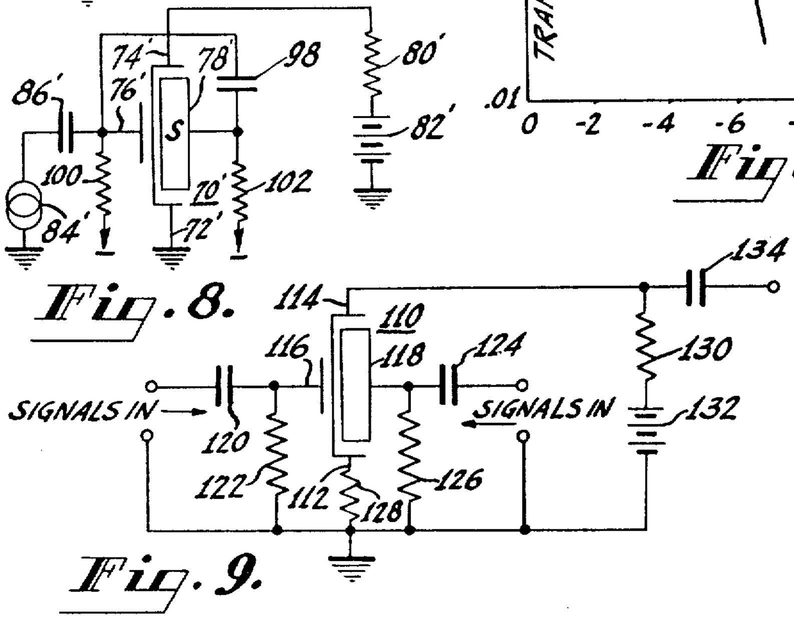
FIG. 8 is a schematic diagram of an amplifier circuit embodying the invention wherein different bias voltages may be applied to the gate and substrate electrodes to provide a modified transconductance vs. control voltage characteristics.
FIG. 9 is a schematic circuit diagram of a mixer circuit embodying the invention.

If desired, the cut off characteristic of an amplifier may be tailored to a predetermined characteristic by applying different biasing voltages to the gate and substrate electrodes as is shown in FIG. 8. The circuit of FIG. 8 is similar to that of FIG. 6, and like components are given like reference numerals. The main difference between the circuits of FIG. 6 and FIG. 8 is that the gate electrode 76′ and the substrate electrode 78′ are isolated for direct currents by a d-c blocking capacitor 98. In addition, different d-c bias voltages are applied to the gate electrode 76′ and substrate electrode 78′ through resistors 100 and 102 respectively. The initial biasing voltages on the gate and substrate electrodes may be set to provide an initial maximum transconductance characteristic. The control bias applied to one of the electrodes 76′ and 78′ may be made more negative while the bias to the other of these electrodes is maintained at a fixed potential, or after a predetermined delay made more positive. The net result is to provide a modified transconductance vs. control voltage characteristic such that the amplifier circuit exhibits a relatively remote cut off as compared to the characteristics indicated by the curves of FIG. 7.

Since the gate and substrate electrodes each provide control over the transconductance of the insulated-gate field-effect transistor, the device may find use as a signal mixer as shown in FIG. 9. The transistor 110 which is of the type shown and described in connection with FIGS. 1 and 2 has a source electrode 112 a drain electrode 114, a gate electrode 116 and a substrate 118. Signals from a first signal source, not shown, are applied to the gate electrode 116 through a signal coupling capacitor 120 and gate biasing resistor 122. Signals from a second source, not shown, are applied to the substrate electrode 118 through a signal coupling capacitor 124 and a substrate bias resistor 126. The source electrode 112 is connected to a point of reference potential, such as ground, through a resistor 128, which may be bypassed for signal frequencies, if desired. The voltage across resistor 128 provides a self-biasing voltage which establishes the desired operating point for the gate and substrate electrodes 116 and 118 respectively, and maintains the source electrode at a positive potential relative to the gate and substrate electrodes. An output circuit represented by the resistor 130 couples the drain electrode 114 to the positive terminal of a source of operating potential 132. Signals developed across the resistor 130 are coupled to suitable utilization means, now shown, through a signal coupling capacitor 134.

The circuit of FIG. 9 is useful as a signal mixer for combining the signals applied to the gate and substrate electrodes. If desired, the mixer may be of the type used in superheterodyne signal receivers wherein one of the signals comprises a source of signal modulated carrier waves and the other source of signals comprises waves from a local oscillation generator. The desired output frequency from the heterodyne process is selected by the use of an output circuit tuned to the desired frequency, which in superheterodyne receivers, is usually the difference between the local oscillator and signal modulated carrier wave frequencies. In like manner, the circuit may also be adapted for use as a product detector such as a synchronous detector or differential amplifier or the like.

Another embodiment of the invention is shown in FIG. 10 which is an amplifier for two signals of different frequencies. A transistor device 140 which may be of the type shown and described in connection with FIGS. 1 and 2 includes a source electrode 142, a drain electrode 144, a gate electrode 146 and a substrate electrode 148. Signals from a first source of signals of a first frequency, not shown, are coupled to a gate electrode 146 through a coupling capacitor 150 and a gate bias resistor 152. Signals from a second source of signals of a second and different frequency, not shown, are coupled to the substrate electrode 148 through a signal coupling capacitor 154 and a substrate biasing resistor 156. The source electrode 142 is connected to ground through a resistor 158 which is bypassed by a capacitor 160 which is of low impedance to signals from both signal sources.

The drain electrode 144 is connected through the series connection of a first output circuit 162 and a second output circuit 163 to the positive terminal of a source of operating potential 166.

The output circuit 162 is tuned to the higher of the first and second frequencies of signals from the two signal sources and signals from the other of the two sources are developed across the resistor 164. Signals developed in the circuit 162 are bypassed around the resistor 164 by a capacitor 170, and around the battery 166 by the capacitor 172. The capacitor 170 exhibits low impedance to signals developed across the circuit 162, but high impedance to the signals from the other source which are developed across the resistor 164.

The capacitor 172 is of low impedance to signals from both of the two sources. Signals developed across the tuned output circuit 162 are coupled by a winding 168 to a utilization circuit, not shown. Signals developed across the resistor 164 are coupled through a coupling capacitor 174 to a utilization circuit not shown.

By way of example the amplifier circuit shown in FIG. 10 may comprise an amplifier circuit of the type commonly used in broadcast radio receivers. The signals which are applied to the gate electrode, for example, comprise a signal modulated intermediate frequency wave which is translated by the amplifier stage and coupled by way of the winding 168 to suitable signal detection means where the audio modulation components of the wave are derived. The audio frequency signal may then be applied to the substrate electrode 148, with the translated audio frequency signal being developed across the resistor 164. The audio frequency signals may then be coupled through the capacitor 174 to further audio amplifier stages. If two relatively high frequency signals of different frequencies are to be amplified such as for example intermediate frequency or radio frequency signals of different frequencies such as are encountered in AM-FM broadcast receivers, the resistor 164 and capacitor 170 may be replaced by a suitably tuned circuit which responds to one of the two intermediate frequencies.

In connection with FIGS. 9 and 10 it is to be understood that different bias voltages may be used on the gate and substrate electrodes. One of these bias voltages, for example may be derived by the source biasing resistor which maintains the source electrode positive with respect to the gate and substrate electrodes. The other of the voltages may be obtained from a suitable operating potential supply such as a voltage divider network across the amplifier power supply.

In the circuits of FIGS. 4, 6, and 8–10 the substrate electrode is reversely biased relative to the source electrode so that the translation of signals applied to the substrate electrode is by a field effect type of action. The impedance looking into the substrate electrode when it is reversely biased relative to the source electrode is very high thereby enabling efficient coupling to a high impedance signal source. Since the input impedance looking into the gate electrode is also very high, signals from a single high impedance source may be simultaneously applied to both the gate and the substrate electrodes as shown in FIGS. 6 and 8, or signals from separate high impedance sources may be applied to the gate and substrate electrodes as is shown in FIGS. 9 and 10.

Circuits wherein the signals applied to the substrate electrode are translated by transistor action, as in junction transistors, or by a combination of transistor action and field effect action, are shown in FIGS. 11–15.

Figure 11:
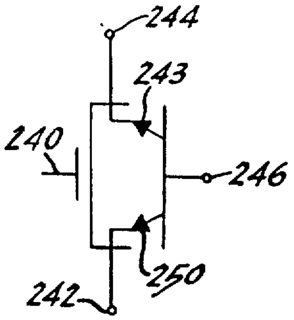
FIG. 11 is a schematic representation of the field-effect transistor shown in FIGS. 1 and 2.

FIG. 11 is a schematic representation of the semiconductor device shown in FIGS. 1 and 2 wherein the gate electrode is represented by the reference character 240 and the interchangeable source and drain electrodes are indicated by the reference characters 242 and 244. The substrate electrode is indicated by the reference character 246. It will be noted with the transistor construction shown in FIGS. 1 and 2 that the source and drain regions S and D are of N-type material, whereas the substrate 246 is of P-type material. The interface between the substrate 246 and the drain and source electrodes comprises a pair of P-N rectifying junctions 243 and 250 respectively. If, as mentioned above, the substrate region is of N-type material relative to the source and drain regions, the poling of the rectifying junctions 243 and 250 will be reversed.

It has been found that, with proper circuit connections, transistor action can be obtained if the substrate electrode 246, the drain electrode 244 and the source electrode 242 are considered as the base, collector, and emitter electrodes respectively of a bipolar or junction transistor, of the NPN type. If the material of the substrate region is N-type relative to that of the source and drain regions the transistor effectively appears as a PNP type transistor. As mentioned hereinbefore, the discussion of the circuits shown in the drawings is restricted to the type of transistor described in connection with FIGS. 1 and 2 having a P-type substrate region. However, it is to be understood that by simple circuit modifications the principles of the invention may also be applied where the substrate is of N-type material.

The amplifier circuit of FIG. 12 utilizes the insulated-gate field-effect transistor 252 similar to the one described in connection with FIGS. 1 and 2. The transistor 252 has a source electrode 254, a drain electrode 256, a gate electrode 258 and a substrate electrode 260. The source electrode 254 is connected through a resistor 257, which is bypassed for signal frequencies by a capacitor 259, to a source of reference potential, shown as ground. The gate electrode 258 is grounded for signal frequencies by a capacitor 262, and a direct current (d-c) bias voltage is applied to the gate electrode 258, from a source not shown. Although the potential applied to the gate electrode is shown to be negative, a positive biasing potential could be applied, if desired. The drain electrode 256 is connected through a resistor 266 to the positive terminal of a source of bias potential 268 which is shown as a battery. The negative terminal of the battery 268 is connected to ground.

The substrate electrode 260 is coupled to a source 270 of signals, to be amplified through a signal coupling capacitor 272. The bias potential on the substrate electrode 260 is derived from a voltage divider comprising a pair of resistors 274 and 276 connected across the battery 268. For signal amplification the substrate electrode 260 is biased to the positive polarity relative to the source electrode so that the substrate electrode 260 and source electrode 254 act as a forward biased base-emitter junction of an NPN type junction transistor. It will be noted that the substrate electrode 260 is less positive than the drain electrode 256 so that these electrodes operate as a reversely biased base-collector junction. Amplified signals developed at the drain electrode 256 are coupled to suitable utilization means not shown.

The drain voltage vs. drain current characteristics as a function of the substrate bias current is shown in FIG. 13. It has been found that the gate electrode 258 may be used to control the source-drain substrate beta ($\beta$). In this case the term beta is equal to an incremental change in drain current divided by an incremental change in substrate current. Since the gate electrode control the beta a control voltage such as an automatic gain control (AGC) voltage may be applied to the gate 258 to change the junction transistor gain without changing its operating point. This is of great importance since it enables a significant reduction in the cross-modulation and other distortion characteristics of a gain controlled transistor amplifier.

From the curves of FIG. 13 it will be seen that the more negative the voltage on the gate electrode the smaller the collector current for a given substrate-source current. The top six curves of FIG. 13 are respectively for the same substrate currents as the bottom six curves. It will be noted that as the gate electrode is made more negative, the incremental change in drain current per incremental change in substrate-source current is reduced.

The channel conduction is modified by changes of the gate bias voltage and therefore the loading between the source and drain electrode changes. In the curves of FIG. 13 the change of loading may be observed by the change in the slope of the curves. In other words the curves for a gate bias voltage of −4 exhibits a greater slope than the curves for a gate bias voltage of −6 volts. Since there is less channel resistance between the source and drain electrodes as the gate electrode voltage becomes more positive, the loading between the source and drain electrodes as seen by the NPN type transistor action is increased.

Figure 14:
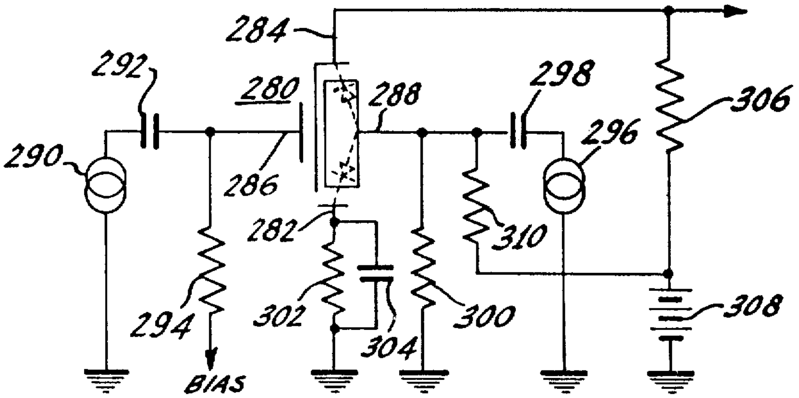
FIG. 14 is a schematic circuit diagram of an amplifier circuit embodying the invention wherein different signals are applied to the gate and substrate electrodes.

Advantage is taken of the transistor action exhibited by the substrate source and drain electrodes in the amplifier circuit of FIG. 14 which shows a generalized form of a signal mixer stage. The transistor 280 which is of the type shown and described in connection with FIGS. 1 and 2 has a source electrode 282, a drain electrode 284, a gate electrode 286 and a substrate electrode 288. Signals from a first signal source 290 are applied to the gate electrode 286 through a signal coupling capacitor 292 and a gate biasing resistor 294.

Signals from a second source 296 are applied to the substrate electrode 288 through a coupling capacitor 298 and a substrate bias resistor 300. The source electrode 282 is connected to a point of reference potential such as ground through a resistor 302 which is bypassed for signal frequencies by a capacitor 304. The voltage across the resistor 302 provides a self-biasing voltage which establishes the desired operating point for the gate electrode 286. An output circuit represented by the resistor 306 couples the drain electrode 284 to the positive terminal of a source of operating potential shown as a battery 308. A resistor 310 is coupled from the positive terminal in the battery 308 to the substrate electrode 288, which resistor in combination with the resistor 300 provides a voltage divider network to establish the operating point of the substrate electrode 288.

The circuit of FIG. 14 is useful as a signal mixer for combining signals applied to the gate and substrate electrodes. If desired the mixer may be of the type used in superheterodyne signal receivers wherein one of the signals comprises a source of signal modulated carrier waves and the other source of signals comprises waves from a local oscillation generator. The desired output frequency signal from the heterodyne process can be selected by the use of an output circuit tuned to the desired frequency, which in superheterodyne receivers, is usually the difference between the local oscillator and signal modulated carrier wave frequencies. In like manner, the circuit may also be adapted for use as a product detector such as a synchronous detector or differential amplifier or the like.

The particular biasing voltage applied to the substrate electrode 288 is selected to be positive relative to the potential at the source electrode 282, thereby establishing a forward bias across the substrate-source rectifying junction. It will be seen that the drain electrode 284 is more positive than the substrate electrode 288 thereby providing a reverse bias across the substrate drain rectifying junction. The parameters of the circuit are such that the electrodes 282, 284 and 288 translate signals from the source 296 by transistor action in the same manner as a bipolar or junction transistor circuit.

Figure 15:
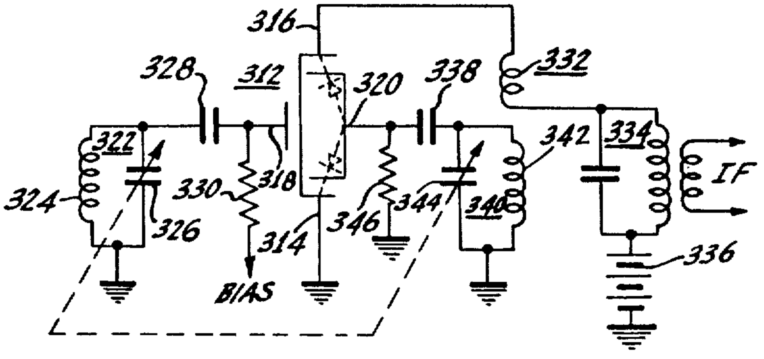
FIG. 15 is a schematic circuit diagram of a self-oscillating frequency converter circuit embodying the invention.

Another embodiment of the invention is shown in FIG. 15 which is a self-oscillating frequency converter. An insulated-gate field-effect transistor 312 which has a source electrode 314, a drain electrode 316, a gate electrode 318, and a substrate electrode 320 is of the general type shown and described in connection with FIGS. 1 and 2. Signal modulated carrier waves are derived from a suitable source 322 such as a signal selection circuit including a ferrite rod antenna winding 324 connected in parallel with a variable tuning capacitor 326 which tunes the signal selection circuit to the frequency of a desired carrier wave. The selected wave is applied to the gate electrode 318 through a coupling capacitor 328 and a gate bias resistor 330. The source electrode 314 is grounded and the drain electrode 316 is coupled through a tickler coil 332 and a parallel resonant circuit 334, tuned to the intermediate frequency of the receiver, to the positive terminal of the operating potential supply 336.

The substrate electrode 320 is coupled through a d-c blocking capacitor 338 to a tunable resonant circuit 340 which includes an inductor 342 and a variable tuning capacitor 344. A resistor 346 provides a d-c path from a substrate electrode 320 to ground.

The tunable circuit 340 determines the frequency of oscillation of the converter, and is tuned in tracking relation with the signal selection circuit 322. Oscillation is sustained by regenerative feedback from the tickler coil 332 to the inductor 342 of the resonant circuit 340. The electrodes 316, 314 and 320 exhibit bipolar or junction transistor operation as the primary mechanism for sustaining oscillations in the circuit. Signal modulated carrier waves applied to the gate electrode 318 are combined by the nonlinear interaction in the circuit to produce heterodyne components, with the difference in frequency between the oscillator and signal modulated carrier wave corresponding to the intermediate frequency to which the circuit 334 is tuned.

If desired the circuit of FIG. 15 may be modified to feed the modulated carrier waves to the substrate electrode, and to connect the oscillator circuit between the source, gate and drain electrodes.

In the circuits of FIGS. 12, 14 and 15, the substrate electrode is forward biased relative to the source electrode and reverse biased relative to the drain electrode so that the translation of signals is by transistor action. The impedance looking into the substrate electrode when it is forward biased relative to the source electrode is relatively low, thereby enabling efficient coupling to a low impedance source as is shown in FIG. 12. If desired the gain of the circuit of FIG. 12 may be controlled by controlling the bias applied to the gate electrode without altering the operating point of the source-substrate-drain circuit. Furthermore signals from high impedance and low impedance sources may be efficiently translated in mixers, product detectors, differential amplifiers and the like as shown in FIG. 14 by coupling the high signal source to the gate electrode 286 and the low impedance signal source to the substrate electrode 288. Still further the gate electrode may be coupled to a high impedance source of signals of a first frequency and the substrate electrode to a low impedance source of a second and different frequency as is shown in FIG. 10. In the latter case the substrate electrode is forward biased relative to the source electrode by a suitable bias source such as a voltage divider network across the battery 166.

What is claimed is:

1. A signal translating circuit comprising,
an insulated-gate field-effect transistor of the type having gate, source and drain electrodes formed on a semiconductor substrate,
circuit means coupled between said gate and source electrodes for establishing an operating characteristic of said transistor;
input circuit means coupled between said substrate and said source electrode for applying signals to be translated, and
output circuit means coupled between said source and drain electrodes for developing output signals corresponding to those applied between said substrate and said source electrode.

2. A signal translating circuit comprising,
an insulated-gate field-effect transistor of the type having gate, source and drain electrodes formed on a semiconductor substrate wherein rectifying junctions are formed between said substrate and said source and drain electrodes, respectively,
circuit means coupled between said gate and source electrodes for establishing an operating characteristic of said transistor;
input circuit means coupled between said substrate and said source electrodes,
means for biasing said substrate in the forward direction with respect to said source electrode and in the reverse direction with respect to said drain electrode, and
output circuit means coupled between said source and drain electrodes.

3. An electrical circuit comprising,
an insulated-gate field-effect transistor of the type having gate, source and drain electrodes formed on a semiconductor substrate,
circuit means coupled between said gate and source electrodes for establishing an operating characteristic of said transistor;
input circuit means coupled between said substrate and said source electrode,
means for biasing said substrate in the reverse direction with respect to said source and drain electrodes, and
output circuit means coupled between said source and drain electrodes.

4. An amplifier circuit comprising,
an insulated-gate field-effect transistor of the type having gate, source and drain electrodes formed on a semiconductor substrate,
means providing a signal input circPit coupled to apply signals between said gate and source electrodes and between said substrate and source electrodes,
means for biasing said substrate to present a high resistance between said substrate and said source and drain electrodes respectively, and
output circuit means coupled between said source and drain electrodes.

5. An amplifier circuit of the type defined in claim 4 wherein said gate electrode and said substrate are direct current conductively connected.

6. An amplifier circuit comprising:
an insulated gate field-effect transistor of the type having gate, source and drain electrodes formed on a semiconductor substrate and exhibiting a predetermined transconductance for signals applied between said source electrode and said substrate,
means providing an input circuit coupled between said gate and source electrodes,
means capacitively coupling said gate electrode to said substrate to apply signals from said signal source to said substrate,
means for biasing said gate electrode to exhibit a first bias voltage with respect to said source electrode,
means for biasing said substrate to exhibit a second and different bias voltage with respect to said source electrode, said second bias voltage being of a magnitude and polarity to reversely bias said substrate with respect to said source and drain electrodes, and
output circuit means coupled between said source and drain electrodes.

7. An electrical circuit comprising,
an insulated-gate field-effect transistor of the type having gate, source and drain electrodes formed on a semiconductor substrate wherein rectifying junctions are formed between said substrate and said source and drain electrodes,
input circuit means coupled between said substrate and said source electrodes,
means connecting said gate electrode to a point of relatively fixed potential,
means for biasing said substrate in the forward direction with respect to said source electrode and in the reverse direction with respect to said drain electrode, and
output circuit means coupled between said source and drain electrodes.

8. A signal translating circuit comprising,
an insulated-gate field-effect transistor of the type having gate, source and drain electrodes formed on a semiconductor substrate and exhibiting a predetermined transconductance for signals applied between said substrate and source electrodes,
a first signal input circuit coupled between said gate and source electrodes for applying first signals to be translated,
a second signal input circuit coupled between said substrate and source electrode for applying second signals to be translated, and
an output circuit connected between said source and drain electrodes for developing output signals that are a function of said first and second signals.

9. A signal translating circuit of the type defined in claim 8 wherein said substrate is reverse biased with respect to said source and drain electrodes.

10. A signal translating circuit as defined in claim 8 wherein said substrate is forward biased with respect to said source electrode and reverse biased with respect to said drain electrode.

11. A plural frequency amplifier comprising, an insulated-gate field-effect transistor of the type having gate, source and drain electrodes formed on a semiconductor substrate, a first input circuit coupled between said gate and source electrodes for signals of a first frequency, a second input circuit coupled between said substrate and said source electrode for signals of a second and different frequency, and means providing first and second output circuits for signals of said first and second frequencies coupled to said drain electrode.

12. A plural frequency amplifier of the type defined in claim 11 wherein said substrate is forward biased with respect to said source electrode and reverse biased with respect to said drain electrode.

13. A plural frequency amplifier of the type defined in claim 11 wherein said substrate is reverse biased with respect to said source and drain electrodes.

14. A signal mixer circuit comprising, an insulated-gate field-effect transistor of the type having gate, source and drain electrodes formed on a semiconductor substrate and exhibiting a predetermined transconductance for signals applied between said substrate and source electrodes, a first input circuit for a first electrical wave coupled between said gate and source electrodes, a second input circuit for a second and different electrical wave coupled between said substrate and source electrode, and impedance means for deriving an output electrical wave in accordance with a function of said first and second electrical wave connected between said source and drain electrodes.

15. A signal mixer circuit of the type defined in claim 14 wherein said substrate is forward biased with respect to said source electrode and reverse biased with respect to said drain electrode.

16. A signal mixer of the type defined in claim 14 wherein said substrate is reversed biased relative to said source and drain electrodes.

17. An electrical circuit comprising, an insulated-gate field-effect transistor of the type having source and drain electrodes connected by a conducting channel formed on a semiconductor substrate, said source and drain electrodes providing connections to source and drain regions of N-type semiconductor material as compared to said semiconductor substrate, said transistor including a gate electrode overlying but insulated from said conducting channel, circuit means coupled between said gate and source electrodes for establishing an operating characteristic of said transistor;

signal input circuit means coupled between said substrate and said source electrode, means for biasing said substrate in the negative direction with respect to said source and drain electrodes, and output circuit means including a load impedance element and a source of direct voltage coupled between said source and drain electrodes, said source of direct voltage having positive and negative terminals, the positive terminal of said source of direct potential connected to said drain electrode and the negative terminal connected to said source electrode.

18. An electrical circuit comprising, an insulated-gate field-effect transistor of the type having source and drain electrodes connected by a conducting channel formed on a semiconductor substrate, said source and drain electrodes providing connections to source and drain regions of N-type semiconductor material as compared to said semiconductor substrate, said transistor including a gate electrode overlying but insulated from said conducting channel, circuit means coupled between said gate and source electrodes for establishing an operating characteristic of said transistor;

signal input circuit means coupled between said substrate and said source electrode, means for biasing said substrate in the forward direction with respect to said source electrode and in the reverse direction with respect to said drain electrode, and output circuit means including a load impedance element and a source of direct voltage coupled between said source and drain electrodes, said source of direct voltage having positive and negative terminals, the positive terminal of said source of direct potential connected to said drain electrode and the negative terminal connected to said source electrode.

19. A signal translating circuit comprising, an insulated-gate field-effect transistor of the type having gate, source and drain electrodes formed on a semiconductor substrate and responsive to signals applied between said source and drain electrodes, signal input circuit means coupled to said gate and substrate electrodes and having a common terminal, means connecting said source electrode to said common terminal, and an output circuit connected between said source and drain electrodes.

20. A self-oscillating frequency converter comprising, an insulated-gate field-effect transistor of the type having gate, source and drain electrodes formed on a semiconductor substrate, a source of signal modulated carrier waves coupled between said gate and source electrodes, an oscillatory circuit coupled between said substrate and source electrodes, circuit means connected between said source and drain electrodes including regenerative feedback means coupled to said oscillatory circuit to sustain oscillation, and an output circuit tuned to a frequency corresponding to the difference in frequency between the signals applied to said gate and substrate electrodes.

21. A self-oscillating frequency converter comprising, an insulated-gate field-effect transistor of the type having gate, source and drain electrodes formed on a semiconductor substrate, said device providing a first set of signal translating electrodes including said source, gate and drain electrodes, and a second set of signal translating electrodes including said source, substrate and drain electrodes, circuit means coupled between said gate and source electrodes for establishing an operating characteristic of said transistor;

an input circuit for a signal modulated carrier waves, a resonant circuit tuned to a frequency which differs from the frequency of said signal modulated carrier waves, means coupling said input circuit for applying said signal modulated carrier waves for translation by one of said sets of electrodes, means coupling said resonant circuit with the other set of electrodes for developing an oscillatory wave at a frequency determined by the resonance frequency of said resonant circuit, and output circuit means for at least one of the heterodyne products of said signal modulated carrier wave and said oscillatory wave.

22. An electrical circuit comprising, an insulated-gate field-effect semiconductor device including source and drain electrodes formed on a substrate of semiconductor material having a predetermined type impurity and a gate electrode disposed between said source and drain electrodes, wherein potentials applied to said gate electrode and said substrate are effective to control the current between said source and drain electrodes, circuit means for applying a current controlling potential to said gate electrode and circuit means interconnecting said source and drain electrodes and said substrate whereby input signals are applied to said substrate and output signals corresponding to said input signals are developed at one of said drain and source electrodes.

23. An electrical circuit comprising, an insulated-gate field-effect transistor of the type having gate, source and drain electrodes formed on a semiconductor substrate and wherein a pair of rectifying junctions are formed between said substrate and said source and drain electrodes respectively, input circuit means coupled between said substrate and said source electrode, output circuit means coupled between said source and drain electrodes, means for biasing said substrate in the forward direction with reespect to said source electrode and in the reverse direction with respect to said drain electrode whereby said source and drain electrodes and said substrate effectively operate as a junction transistor having a predetermined beta, and means providing a source of gain controlling potential coupled to said gate electrode to control the beta of said transistor as a function of the amplitude of said gain controlling potential.

24. An oscillation generator which comprises an insulated-gate field-effect transistor of the type having gate, source and drain electrodes on a semiconductor substrate, said source, drain and substrate providing three terminals, circuit means coupled between said gate electrode and said source terminal for establishing an operating characteristic of said transistor; an input circuit connected to two of said terminals, an output circuit connected to one of said last-named terminals and to the third of said terminals, and a regenerative feedback path coupling the output circuit to the input circuit.

25. A transistor amplifier comprising:

a field effect transistor provided with a semiconductor substrate;

a channel layer formed on said semiconductor substrate;

source and drain electrodes fitted on both ends of said channel layer;

an insulating layer formed on said channel layer;

a first gate electrode fixed on said insulating layer and a second gate electrode fixed on said semiconductor substrate;

a bias voltage source;

an operating power source;

a signal source;

a load;

means to connect said load and operating power source in series with said source and drain electrodes;

means to connect said bias voltage source to said first gate electrode; and means to connect said signal source to said second gate electrode.

26. The transistor amplifier as defined in claim 25, wherein said signal source is connected between said second gate electrode and the operating power source, and said bias voltage source is connected between said first gate electrode and the operating power source.

27. A two input field effect transistor amplifier comprising

1. a field effect transistor having a. a semiconductor substrate of one conductivity type;

b. a channel layer of opposite conductivity type to that on said semiconductor substrate, a pn junction being formed between said substrate and said layer;

c. source and drain electrodes provided on said channel layer, spaced apart from each other;

d. a first gate electrode provided over said channel layer in an electrically insulated manner;

e. a second gate electrode formed on the substrate;

2. first and second divider circuits connected to said first and second gate electrodes, respectively; and

3. means for applying two input signals to the first and second gate electrodes through each divider circuit, whereby an output signal obtained from the drain electrode is controlled by said two input signals.

* * * * *